March 22, 1927. 1,622,101
W. J. FRANCKE
FLEXIBLE COUPLING
Filed Oct. 23, 1922 2 Sheets-Sheet 1
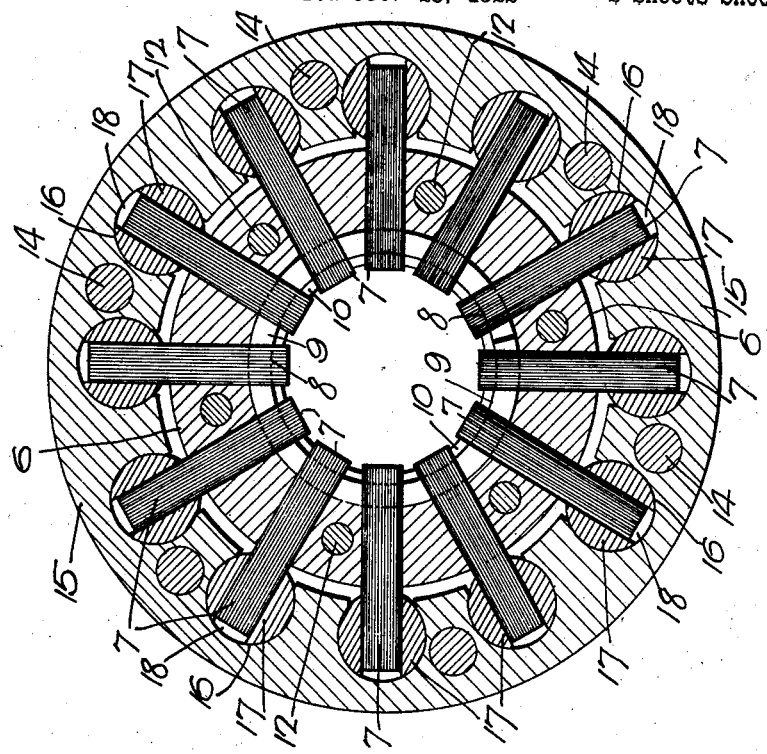
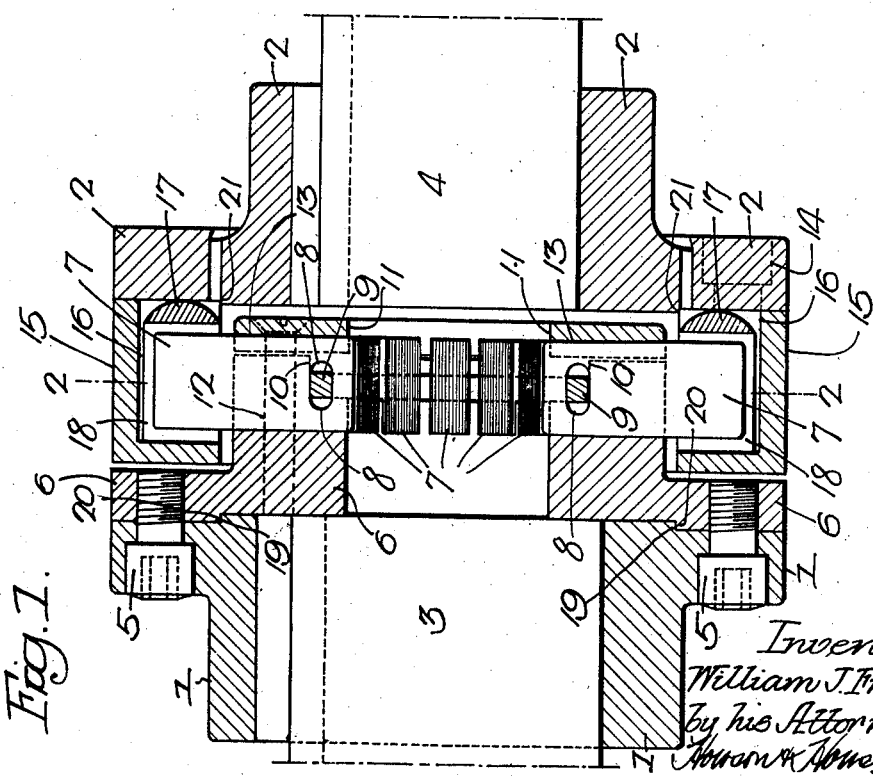
Inventor
William J. Francke
by his Attorneys March 22, 1927.

W. J. FRANCKE 1,622,101

FLEXIBLE COUPLING

Filed Oct. 23, 1922

Inventor:—
William J. Francke.
by his Attorneys.—
Howson & Howson

Patented Mar. 22, 1927.

1,622,101

UNITED STATES PATENT OFFICE.

WILLIAM J. FRANCKE, OF NEW BRUNSWICK, NEW JERSEY, ASSIGNOR, BY MESNE ASSIGNMENTS, TO JOHN WALDRON CORPORATION, OF NEW BRUNSWICK, NEW JERSEY, A CORPORATION OF NEW JERSEY.

FLEXIBLE COUPLING.

Application filed October 23, 1922. Serial No. 596,334.

The object of this invention is to provide a flexible coupling that will meet all requirements as to parallel and angular misalignment of the coupled shafts, float, and cushion, and having extended bearing surfaces to carry the load, the coupling possessing the novel and advantageous features of construction hereinafter set forth.

Another object of the invention is to provide a flexible coupling in which the inner engaging elements of the coupling may be removed without disturbing either the shafts or the flanges which unite the contacting elements to the coupled shafts.

In the attached drawings:

Figure 1, is a transverse section through the coupling;

Fig. 2, is a section on the line 2—2, Fig. 1;

Figure 3:
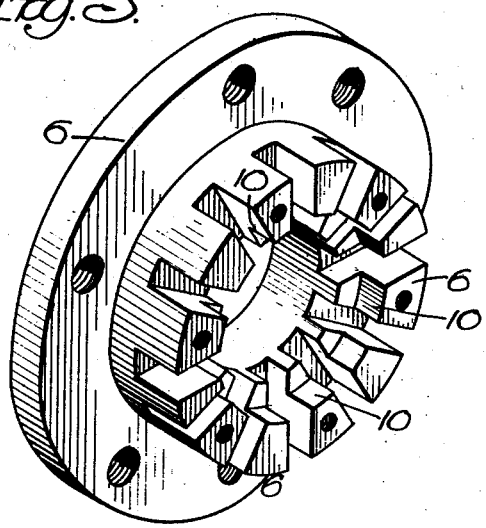
Fig. 3, is a view in perspective of one of the coupling elements.
Figure 4:
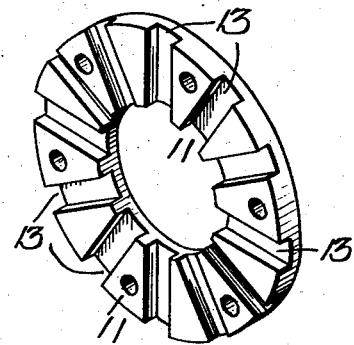
Fig. 4, is a view in perspective of another of the coupling elements.
Figure 7:
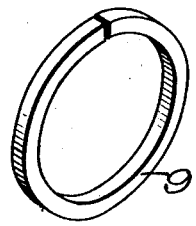
Fig. 7, is a view in perspective of the retaining ring for the connector elements.
Figure 5:
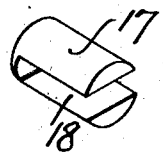
Fig. 5, is a view in perspective of one of the bearing pins.
Figure 6:
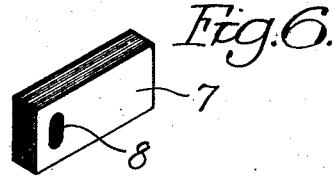
Fig. 6, is a view in perspective of one of the flexible connector elements.

With reference to the drawings, the coupling comprises a pair of flanged elements 1 and 2 respectively attached to the shafts 3 and 4 which it may be desired to couple. Secured to the flange 1 by means of bolts 5 is a flanged member 6 having therein a series of evenly spaced radial recesses for the reception of a series of flexible connecting elements 7. As clearly shown, each of the elements 7, which in the present instance are made up of a number of shims or thin rectangular plates, has in its inner end an aperture 8 through which passes a split retaining ring 9, the ring occupying an annular recess 10 in the member 6 and tending to prevent longitudinal movement of the elements within their respective recesses. A ring-shaped retaining disk 11 is secured to the exposed face of the member 6 by means of screws 12, said disk having a series of radial recesses 13 for the securing elements 7, and functioning to retain the securing elements and the ring 9 within the recesses in the member 6.

Secured to the inner face of the flange 2 by means of bolts 14 is a ring-shaped coupling member 15, said member being provided with a series of evenly spaced cylindrical recesses 16 for the reception of a set of cylindrical bearing pins 17, these latter being slotted at 18 for the reception of the outer ends of the connecting elements 7 which project into the recess 16 and the slots 18 in the pins 17.

As shown in Fig. 1, the flange 1 has on its forward face an annular shoulder 19 which fits behind a corresponding recessed shoulder 20 in the coupling member 6. Similarly, the ring 15 fits behind an annular shoulder 21 on the flange 2, these shoulders not only insuring a proper concentric position of the members 6 and 15 on their respective flanges, but adding to the strength of the joints.

It will be apparent that by removing the bolts 5 and 14, and by moving the members 6 and 15 together, the shoulders 19 and 21 may be cleared by the said members, which may then be removed from between the flanges and the ends of the shafts without disturbing the position of the flanges or the shaft. Removal of the elements 7 may be accomplished by release of the screws 12 and removal of the ring 11, while the bearing pins 17 may be removed from the recesses 16 after removal of the member 15 from between the flanges. All parts of the coupling subject to wear may thus be removed for replacement or repair without disturbing the shafts or the flanged coupling members which are secured to them.

I claim:

A flexible coupling comprising a pair of flanged members adapted for attachment respectively to the adjacent ends of two substantially aligned shafts, an element detachably secured to the face of one of said members and having a laterally projecting annular part with radial slots, flexible coupling elements mounted in the slots and projecting beyond the periphery of the annular part, said flexible elements having apertures at their inner ends, a retaining ring extending through the said apertures and supporting the flexible elements in the slots, a plate detachably secured to the outer face of the annular part enclosing the outer sides of the slots, and an annular member detachably secured to the face of the other flanged member and surrounding the aforesaid annular part and having recesses in the inner face thereof for reception of the projecting outer ends of the flexible elements.

WILLIAM J. FRANCKE.